(12) United States Patent
Cooper et al.

(10) Patent No.: US 7,647,404 B2
(45) Date of Patent: Jan. 12, 2010

(54) METHOD OF AUTHENTICATION PROCESSING DURING A SINGLE SIGN ON TRANSACTION VIA A CONTENT TRANSFORM PROXY SERVICE

(75) Inventors: Nathaniel Cooper, Manassas, VA (US); Steven Hodecker, Fairfax, VA (US); Douglas Yeager, Fairfax, VA (US)

(73) Assignee: Edge Technologies, Inc., Fairfax, VA (US)

( * ) Notice: Subject to any disclaimer, the term of this patent is extended or adjusted under 35 U.S.C. 154(b) by 398 days.

(21) Appl. No.: 11/700,254

(22) Filed: Jan. 31, 2007

(65) Prior Publication Data
US 2008/0183902 A1 Jul. 31, 2008

(51) Int. Cl.
*G06F 15/173* (2006.01)
(52) U.S. Cl. ............... 709/225; 709/229; 713/185; 726/12
(58) Field of Classification Search ............... 726/2, 726/5, 8, 12; 713/185; 709/225, 229
See application file for complete search history.

(56) References Cited

U.S. PATENT DOCUMENTS

| 6,647,421 | B1 | 11/2003 | Logue et al. | |
|---|---|---|---|---|
| 7,246,230 | B2* | 7/2007 | Stanko | 713/155 |
| 7,480,718 | B2* | 1/2009 | Marcus et al. | 709/225 |
| 2002/0178271 | A1* | 11/2002 | Graham et al. | 709/229 |
| 2004/0250118 | A1* | 12/2004 | Andreev et al. | 713/201 |
| 2005/0015490 | A1* | 1/2005 | Saare et al. | 709/225 |
| 2006/0041933 | A1* | 2/2006 | Yakov et al. | 726/8 |
| 2006/0119883 | A1* | 6/2006 | Lovat et al. | 358/1.15 |
| 2006/0195893 | A1* | 8/2006 | Caceres et al. | 726/8 |
| 2007/0006291 | A1* | 1/2007 | Barari et al. | 726/10 |
| 2007/0208936 | A1* | 9/2007 | Ramos Robles | 713/168 |
| 2007/0283421 | A1* | 12/2007 | Hirose | 726/4 |
| 2007/0288634 | A1* | 12/2007 | Nakatsuyama | 709/225 |
| 2008/0005789 | A1* | 1/2008 | Kigo et al. | 726/5 |

OTHER PUBLICATIONS

Nobayashi et al., "Development of Single Sign-On System with Hardware Token and Key Management Server," Systems and Networks Communications, ICSNC 2007.*
Vecchio et al., "CredEx: user-centric credential management for grid and Web services," Web services, ICWS 2005.*
Bills S., "Single Sign-On Debate: Security vs. Convenience," American Banker, New York, Jan. 2006, vol. 171, Iss. 10, p. 9.*

(Continued)

*Primary Examiner*—Oanh Duong
(74) *Attorney, Agent, or Firm*—Jacobson Holman PLLC

(57) ABSTRACT

The Content Transform Proxy (CTP) service is an advanced Web proxy service, the basic function of which is to modify incoming HTTP requests having a server-side destination and/or outgoing HTTP responses. The CTP service is implemented by the CTP program, which resides on a host in a data communications network between an end user (the Web client) and a content server that the client is attempting to access. The HTTP request and/or an HTTP response is modified by making an HTTP request on the client side using a client web browser, processing the HTTP request on the server side using outgoing proxy rules, passing on the processed HTTP transaction to the server-side destination, returning the results of the processed HTTP request from the server-side destination, processing the HTTP response on the server side using incoming proxy rules, and returning the processed HTTP response to the client web browser on the client side.

2 Claims, 6 Drawing Sheets

OTHER PUBLICATIONS

"Ping Identity Debuts PingTrust, the First Standalone WS-Trust Security Token Server; Extends Federated Identity and Web Single Sign-On In Support of the Identity Metasystem," Business Wire, Newyork, Feb. 2006, p. 1.*

"Squid Web Proxy Cache," www.quid_cache.org (retrieved Sep. 14, 2006).

"Squid Web Proxy Wiki," http://wiki.squid_cache.org/SquidFaq/AboutSquid, p. 1 (retrieved May 1, 2007).

"Squid User's Guide," Chapter 1 ("Terminology and Technologies"), http://www.deckle.co.za/squid-users-guide/Terminology_and_Technologies#Terminology (retrieved May 1, 2007).

"PortletBridge Portlet Features," http://www.portletbridge.org/features.html (retrieved May 1, 2007).

"Junk Zapper," The Sysadmin's Daily Grind: Webcleaner, www.linux-magazine.com, Jun. 2004.

"WebCleaner—a filtering HTTP proxy," http://webcleaner.sourceforge.net (retrieved Sep. 14, 2006).

"WinProxy User Manual," Ositis Software, Inc., Feb. 2002, Table of Contents and pp. 1-5.

"Secure Computing: Webwasher," www.securecomputing.com (retrieved Sep. 14, 2006).

* cited by examiner

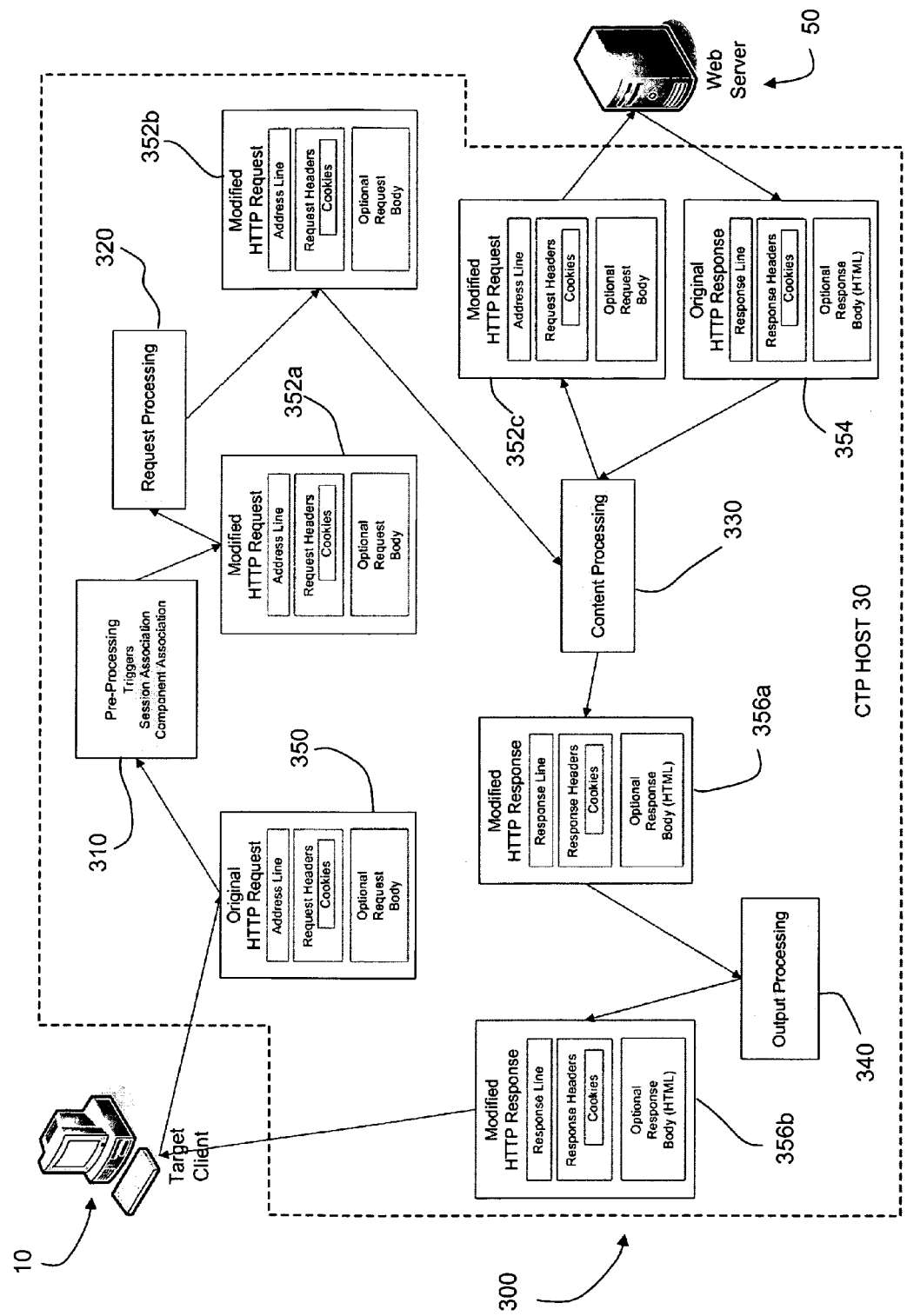

METHOD OF AUTHENTICATION PROCESSING DURING A SINGLE SIGN ON TRANSACTION VIA A CONTENT TRANSFORM PROXY SERVICE

CROSS-REFERENCE TO RELATED APPLICATIONS

Not applicable.

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to Web proxy services. More specifically, the invention relates to an advanced Web proxy service capable of modifying incoming and outgoing Web transactions.

2. Related Art

Various Web proxy services are currently available commercially. Examples include WebCleaner, Winproxy6, Webwasher, Portlet Bridge, and Squid Proxy. Webcleaner is a "C"-based, open source filtering HTTP proxy-HTML parser and filter. Winproxy6 is an Internet security proxy that provides anti-spyware protection, a firewall, antivirus protection, and Web filtering. Webwasher is a secure content management suite proxy that offers security solutions for individual threats (for example, worms and viruses in spam emails, malware on active Web pages, spyware, and ransom-ware), and that is hardware or software based. PortletBridge is a Web clipping proxy portlet for deployment within a Web portal. It is used to rewrite content from a downstream Website. The PortletBridge portlet makes downstream HTTP calls and uses CyberNeko and XSLT to do the Web clipping. It must operate in a portal environment and cannot be deployed remotely. Squid Proxy is an open source Web proxy cache server software used to proxy and cache HTTP, HTTPS, FTP, and other URLs.

Although the commercially-available Web proxy services provide a variety of features, none of the above-described Web proxy services employ an XML-based rules and scenario scripting language, which would enable building and activating rules in real time. They also do not enable operator role and user, privilege-based rule visibility selection or provide a broad range of configurable scenario and/or rule-based activities, full bi-direction content filtering and/or blocking, full bi-directional content insertion, native bi-directional content routing and/or redirecting, full bi-directional content modification, or replacement and rule-based substitution of multiple types of Internet objects.

Network Web applications tend to be complicated and do not easily fit into a Web portal environment. None of the commercially-available Web proxy services is capable of executing content modification so as to enable complicated network Web applications to work through the portal.

The URLs that are contained in proxied pages must be encoded or "wrapped." All references (anchor tags, images, JavaScript code references, etc.) need to be modified, so that when the client requests the specific content, the reference is translated on the proxy server and the actual path is resolved. For traditional proxies, the reference on the proxy server is supported as part of the protocol specification. Other solutions have utilized JavaScript to dynamically rewrite a page on the client side. Alternatively, the information is embedded in the QUERY_STRING (the part of a URL that contains data to be passed to CGI programs) or passed in cookies that contain the host and port for the content. All of these solutions have significant limitations in accomplishing the desired function (hiding/retrieving/modifying HTTP responses without modifying the browser configuration).

It is to the solution of these and other problems that the present invention is directed.

SUMMARY OF THE INVENTION

It is accordingly a primary object of the present invention to provide an advanced Web proxy service capable of modifying incoming and outgoing Web transactions.

It is another object of the present invention to provide a proxy server and router application that can execute content modification to enable complex Web applications in addition to simple Web content.

It is still another object of the present invention to provide a proxy server and router application that transparently resides in the data communications network between the user and source systems.

It is another object of the present invention to provide a proxy server and router application having a modular design path to ensure its security and to deliver specific capabilities required by users.

It is another object of the present invention to provide a proxy server and router application in which scenarios and/or rules can be cascaded as triggers or cascaded to develop complex scenarios.

It is another object of the present invention to provide a proxy server and router application that is designed to ensure stealthy operation, with no apparent signature to enable the user to detect its operation.

It is another object of the present invention to provide a proxy server and router application that is designed for minimal CPU usage and memory footprint.

It is another object of the present invention to provide a proxy server and router application that is built for speed and scalability.

It is another object of the present invention to provide a proxy server and router application having easily configured, repeatable rules.

It is another object of the present invention to provide a proxy server and router application that can dynamically remove, replace, redirect and alter any targeted Web page or partial Web page, with or without user knowledge.

It is another object of the present invention to provide a proxy server and router application that can log all Web pages viewed by a user, with or without the user's knowledge. From this log, one can directly reproduce that user's browsing experience.

It is another object of the present invention to provide a proxy server and router application that can remove, block, or dynamically interrogate information in the data stream, thereby altering the view and/or protecting the user.

It is another object of the present invention to provide a proxy server and router application that can route user traffic to specific Websites, content, and other sources with or without knowledge of the user.

These and other objects are achieved by an advanced Web proxy service, referred to herein as the Content Transform Proxy (CTP) service, the basic function of which is to modify incoming and/or outgoing Web transactions, more specifically, HTTP requests and/or HTTP responses. The CTP service is implemented by the CTP program, which resides on a host on some location in the data communications network between the end user (the Web client) and the content server that the client is attempting to access.

The method of modifying an HTTP request and/or an HTTP response includes the steps of making an HTTP request on the client side using a client web browser, the HTTP request having a server-side destination, processing the HTTP request on the server side using outgoing proxy rules to determine whether to modify the HTTP request, and passing on the processed HTTP transaction to the server-side destination, returning the results of the processed HTTP request from the server-side destination, processing the HTTP response on the server side using incoming proxy rules to determine whether to modify the HTTP response, and returning the processed HTTP response to the client web browser on the client side.

The method further includes the steps of setting up a sequence of filtering streams, reading one of the filtering streams, building a window of operation containing possible text of interest when one of the streams is read, wherein at least one regular expression is used to define a corresponding at least one rule that in turn defines the text of interest and the actions required on the text of interest; creating a buffer by comparing the possible text of interest with text bounding the possible text of interest, determining whether the buffer matches a predefined condition, and when the buffer matches the predefined condition, handing off the buffer to another entity responsible for running the at least one regular expression.

A system for modifying the Web transactions includes a host on the server side and a Web proxy transform means residing on the host for modifying a Web transaction before and/or after the Web transaction passes through the host.

In one aspect of the invention, the system further includes content transform proxy server means for containing data storage for the host, JSP server means for carrying out primary transaction processing in the host, and content transform proxy Web server means for initially receiving an incoming request from the client side.

The content transform proxy server means includes management means for managing a user session with the Web transaction; and the JSP server means includes means for reading and parsing XML formatted proxy rules, determining what rules should be run, and retrieving and/or modifying HTTP content coming from the client side.

The JSP server means also includes transaction processor means for managing the processing stages in the transaction processing, wherein the transaction processor means includes stream buffering means for processing multiple sequences of regular expressions in the HTTP content, transaction processing means for prompting actions on the request in response to triggers, for modifying the request based on rules, and for modifying the response based on rules, authentication processing means for carrying out authentication processing required as part of any aspect of a transaction processing request, content processing, and/or output processing, as well as URL wrapping means for encoding URLs contained in the proxied pages.

In another aspect of the invention, the Web proxy transform means has a plurality of system components and including server means for containing the data storage of all system components in the Web proxy server, servlet engine means for processing primary transactions in the Web proxy server, and request-receiving means for initially receiving an incoming HTTP request. The request-receiving means is a Web server separate from the servlet engine means; and the servlet engine means includes an HTTP server component, and the request-receiving means is the HTTP server component of the servlet engine means.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3 is a diagram showing the different stages or steps of HTTP transaction processing carried out by the CTP program resident in the CTP server, and the different HTTP components which are acted on.

DETAILED DESCRIPTION OF THE PREFERRED EMBODIMENTS

Figure 1:
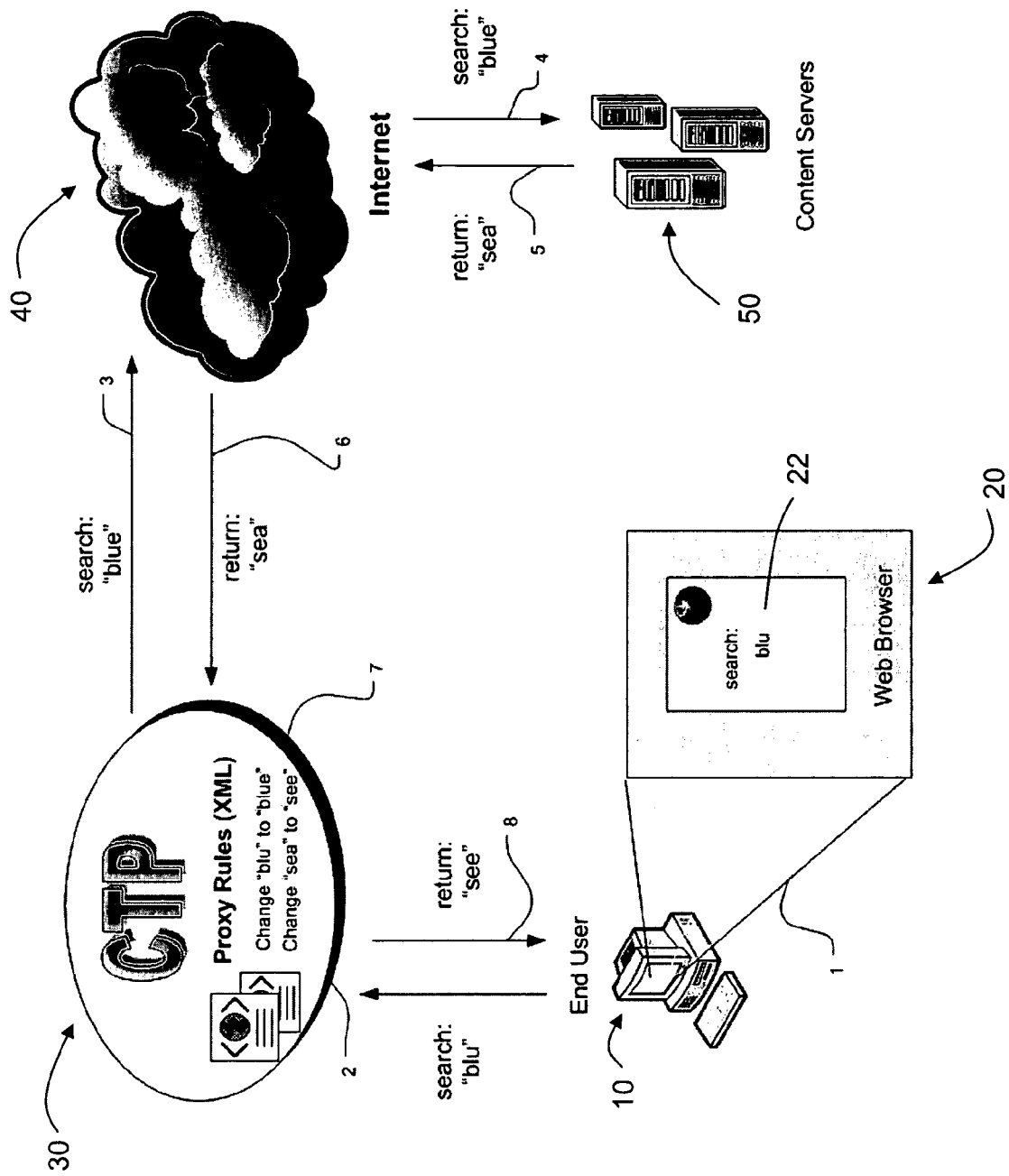
FIG. 1 is a functional diagram of the CTP service in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The present invention is preferably practiced within a Web client/server programming environment that uses commonly used networking protocols (TCP/IP, HTTP). As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

As is known to those with skill in this art, client/server environments may include public networks, such as the Internet, and private networks often referred to as "Intranets" and "Extranets." The term "Internet" shall incorporate the terms "Intranet" and "Extranet" and any references to accessing the Internet shall be understood to mean accessing an Intranet and/or and Extranet, as well. The term "computer network" shall incorporate publicly accessible computer networks and private computer networks.

The following acronyms and definitions are used herein:

HTTP: Hypertext Transfer Protocol—a specification of a protocol commonly used today. This protocol was originally created to facilitate the transfer of HTML pages.

HTML: Hypertext Markup Language—a standard used for specifying the structure of a visual page using text-based markup language. Most all of the pages viewed on the Internet using a Web browser are written as HTML documents.

Proxy Server: A computer server or program which provides clients access to external resources in lieu of a direct connection to those resources.

Rules: XML file inputs which technically define an action for the proxy.

Scenarios: desired behaviors (for example, change all instances of the string 'cat' to 'dog' in Web traffic from a specific site), which are implemented by rules.

XML: Extensible Markup Language—a generic markup language specification. This standard provides a method of encoding structured information.

The present invention is directed to an advanced Web proxy service, referred to herein as the Content Transform Proxy (CTP) service, the basic function of which is to modify incoming and outgoing Web transactions. The CTP service is implemented by the CTP program, which resides on a host on some location in the data communications network between the end user (the Web client) and the content server that the client is attempting to access.

Although the basic function of the CTP service is to modify incoming and outgoing Web transactions, the CTP service has a variety of features and capabilities. These features and capabilities include: (1) a transparent proxy (does not require browser reconfiguration or special software to be installed in the client machine); (2) an HTTP/HTTPS proxy (requires browser configuration or modified network routing); (3) an external data Application Program Interface (link to external applications); (4) a remote management API bi-directional data sniffer (which includes (a) a browser-based graphical user interface (GUI), (b) HTTP/HTTPS session and object data storage/persistence, (c) hierarchical breakout of all HTTP/HTTPS session and message components, and (d) browser-based visualization of session components to session objects (images, cookies etc.)); (5) a browser-based operator console GUI; (6) a browser-based administration console; (7) system username and password access control; (8) XML-based rule and scenario scripting language (no software developer actions required—enables building and activating rules in real time); (9) operator role and user, privilege-based rule visibility selection; (10) configurable scenario and/or rule-based activities (including: (a) ability to create scenarios/activities from an XML rule base; (b) ability to create parameterized scenarios; (c) ability to assign priority to scenarios; (d) ability to trigger rules on TCP/IP; (e) HTTP and out-of-band protocol header data and attributes; (f) ability to trigger rules on HTTP message body data and attributes; (g) ability to trigger rules on HTTP attachment data and attributes; (h) ability to trigger rules on external application generated events via API; (i) ability to apply multilevel rule and scenario action triggers; (j) ability to cascade rules; (k) ability to run parallel rules; (l) scenario scheduling (start time and duration); (m) ability to save and export rules and scenarios; and (n) use of pre-built operating rules and scenarios to trigger event notification)); (11) bi-directional content filtering/blocking of bi-directional content insertion; (12) bi-directional content routing/redirecting (ability to route HTTP/HTTPS/out-of-band protocol traffic); (13) bi-directional content modification; (14) bi-directional content mirroring (save to external file, server, or repository); (14) multi-type internet object filtering (for objects including HTTP/HTTPS, DHTML, text, JavaScript, object code, Web services, XML, audio and video, images, links, flash, binary); (15) multi-type internet object substitution (for objects including HTTP/HTTPS, DHTML, text, JavaScript, object code, Web services, XML, audio and video, images, links, flash, binary); (16) multi-type internet object modification (for objects including HTTP/HTTPS, DHTML, text, JavaScript, object code, Web services, XML, audio and video, images, links, flash, binary); (17) high speed, low transaction overhead; (18) a Java-based software appliance; and (19) compatibility with all common operating systems (including Windows XP and 2000, LINUX, Sun Solaris/Unix, VMWARE, HP-UX, IRIX).

FIG. 1 illustrates a very simple Web transaction in which the CTP service is used to modify content that is transferred to and from the Internet. The steps in the transaction are as follows:

1) A user 10 opens up a Web browser 20 to a particular content site, and in a search box 22, enters the string "blu" (maybe a typo) for searching.

2) The HTTP transaction is processed through the CTP host 30 (shown also in FIG. 3). The CTP program (which is resident in the CTP host 30) is loaded with proxy rules, which dictate what changes (if any) the CTP service should make on transactions. In this case, there is a rule that states for outgoing requests: "change any instances of the string 'blu' to the string 'blue'." The proxy rules exist in memory in the CTP host 30 (under Tomcat). Typically, the rules are loaded into the CTP host 30 as XML files, as XML is the only external format for the files. It is also possible to use a graphical user interface ("GUI") to create and/or edit the rules, but the rules can still be exported as XML Files.

3) The CTP service passes this modified request on to its original destination.

4) The search request for "blue" is passed on through the Internet 40 to the content server 50 that the end user 10 has selected.

5) The content server 50 returns the results for the search of "blue." In this case, the results contain the string "sea."

6) The resulting message containing the string "sea" is passed on through the Internet 40 back to the CTP host 30.

7) The resulting message again traverses the CTP host 30. Again, the CTP service examines the transaction against its rule-set. In this case, the rule for incoming responses: "change any instances of the string 'sea' to the string 'see' modifies the return transaction so the result now has the string 'see'."

8) The response with the string "see" is then returned to the user's browser 20.

While this example illustrates a trivial Web transaction, the CTP service can be configured to modify any aspect of the Web content, either on the HTTP Request, or on the HTTP Response, for some or all transactions. For example, the CTP service could be configured to change "blu" to "blue" for just one specific client address. Typical CTP transactions can thus affect the HTTP header, the HTTP content, session cookies, and POST data. Additionally, the CTP service provides a robust set of syntax and rules that allows administrators to create advanced proxy rules. This syntax and the CTP service's novel four-stage transaction process are described in greater detail hereinbelow.

Because the CTP service can affect every component of a Web transaction, it is not possible to enumerate all of its potential functions. Table 1 lists different Internet Objects on which the CTP service can act (that is, that it can search, alter, and/or replace).

TABLE 1

Multi-type Internet Object Replacement/Substitution

| | |
|---|---|
| HTTP/HTTPS (SSL) | Streaming media (e.g., Audio and Video) |
| DHTML, HTML | Images |
| Text | Links |
| JavaScript | Flash |
| Object Code | Binary |
| Web Services | Applets |
| XML (Transforms) | Web services (.net, SOAP) |
| ActiveX components | Native TCP/IP |

The CTP service can dynamically and seamlessly inject data of any type (including streaming media, images, text, and links) into existing Web content in real time at any time. Table 2 provides examples of how modification of the items in Table 1 would exist operationally.

TABLE 2

| Action | Description |
|---|---|
| Swap image link | Using the CTP service's ability to find/replace content, the CTP service can modify the content of an HTML image link (the <IMG> tag) and replace an identified image with another image link |
| Redirect a link to another site | Again, using the content processing rules, the CTP service can search for a specific link in a page (the <A HREF> tag) and replace the content of the tag to another site. Alternatively, the CTP service can just redirect a request to a given site, to another completely different site. |
| Submit session authentication cookie | Using its system of managing authentications, the CTP system can keep track of a session cookie to a particular site, and submit cookie to a site on behalf of a client. This action involves many aspects of the CTP service: modifying the HTTP header, using the authentication resolving technology, editing content, etc. |
| Change JavaScript URL actions | The CTP service can, as part of the content management, edit JavaScript before it is returned back to the client. |
| Wrapping Links | In order for any URL reference to be successfully resolved in a proxy environment, it must be modified or "wrapped" to function correctly. The CTP service provides a method of wrapping and obfuscating these wrapped links. |

The CTP service can select and target Web content delivery to users based on IP address, geography, credentials (credentials are stored for each user, for each application), and any variable within the data stream. It can also collect valuable user and usage data (including statistics), regardless of browser, cookie, or security settings. Examples of user statistics collectable by the CTP service include, but are not limited to, products viewed, frequency of events, time spent by page or activity, IP address of the user's machine, cookies and server tags, and other relevant server data.

Figure 5:
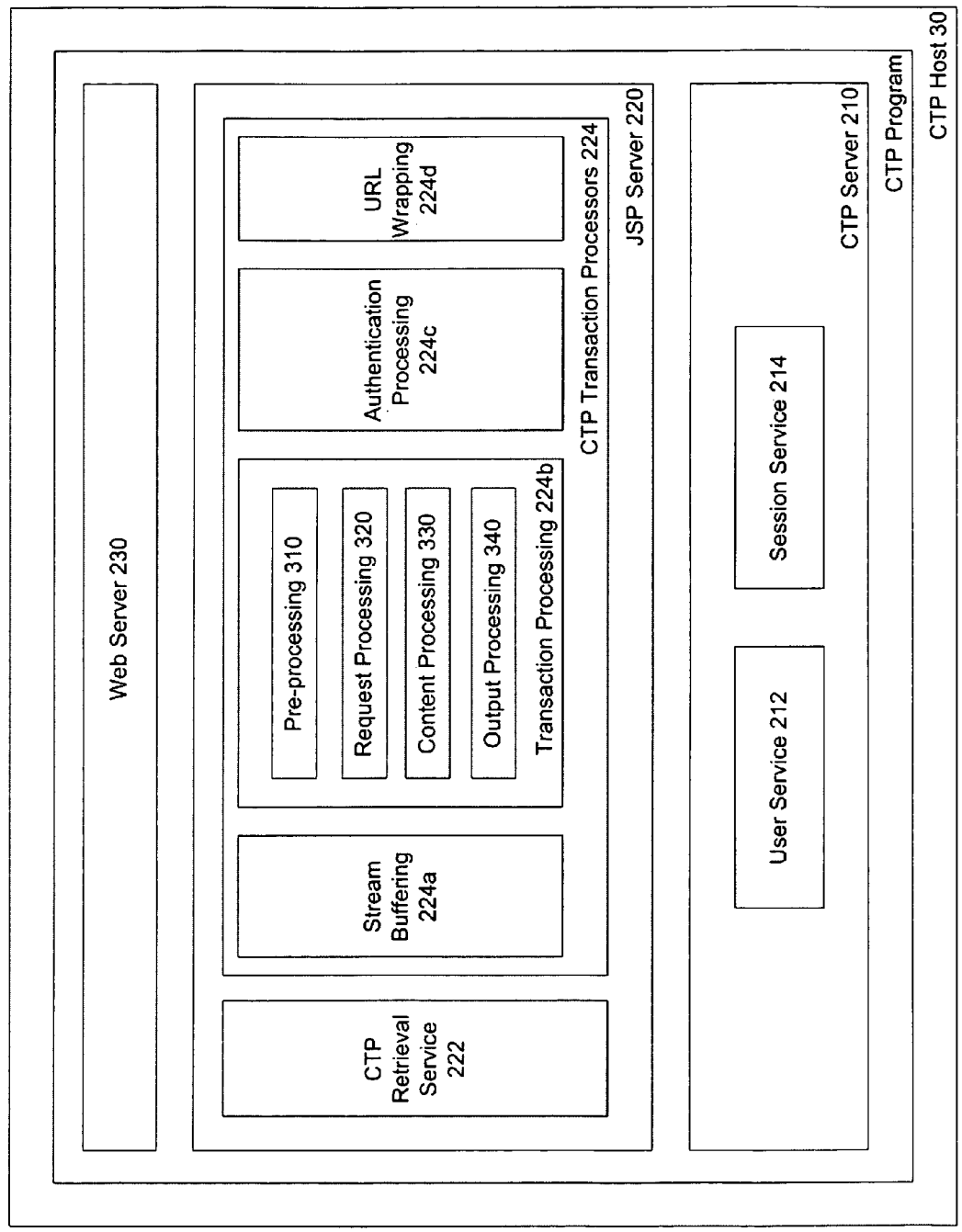
FIG. 5 is a diagram illustrating the relationship between the hardware and program components and between the program components and the functionalities of CTP service.

With reference to FIG. 5, in terms of its architecture, the CTP program is a three-tiered Web proxy server that modifies Web transactions that pass through the host 30 on which it resides. The three tiers, or processes, are a CTP Server 210, a JSP Server 220, and a CTP Web Server 230. Within these three tiers, or processes, the CTP service also has four functional components: a CTP Retrieval Service 222, a Transaction Processors 224, a User Service 212, and a Session Service 214.

Figure 2:
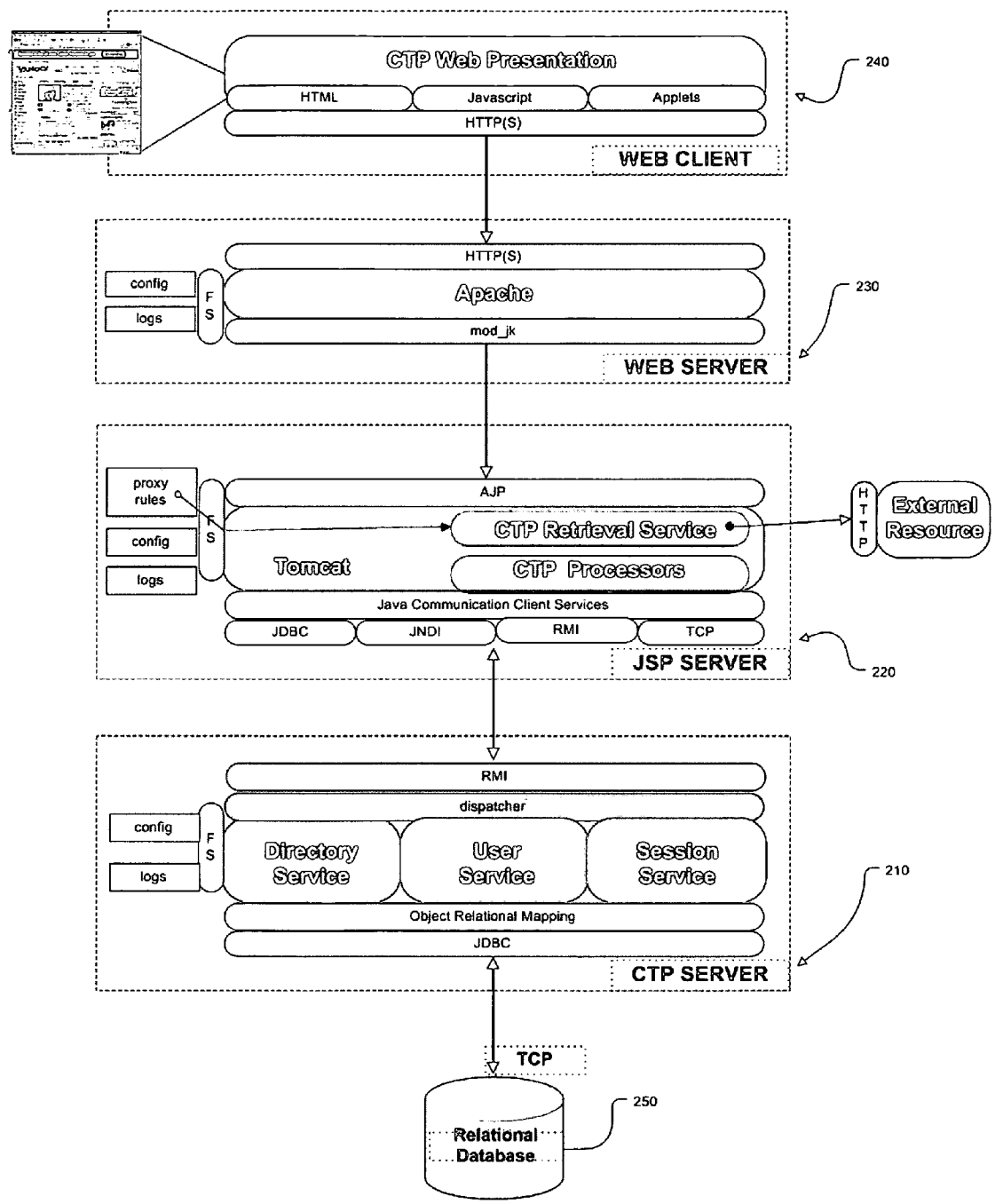
FIG. 2 is a diagram of the detailed architecture of the different CTP components, as well as the Web client and data store.

FIG. 2 illustrates the architecture of the different CTP program processes 210, 220, and 230, as well as the Web client 240 and the relational database 250.

The CTP Server 210 contains the data storage of all system components in the CTP host 30. The User Service 212 and the Session Service 214 functional components are contained in the CTP server 210, and are responsible for managing the user session within the CTP transactions ("user session" being used herein to mean an encounter between a user and an application or with the computer in general, one user session being the time between starting the application and quitting).

The Servlet Engine 220 (also referred to as a JSP server) is the jsp container for the primary transaction processing in the CTP host 30. An example of a specific JSP Server that can be used in implementing the invention is Tomcat, an open-source server developed by the Apache Software Foundation. Server-side Java code is run by a Java Servlet API (for example, Sun's Java Servlet API). The communication between the HTTP Server and the Servlet Engine is implemented by a protocol such as (in the case of Tomcat) the Apache JServ Protocol ("AJP").

The JSP Server container holds the CTP Retrieval Service 222, which is the primary retrieval component of the CTP service. The CTP Retrieval Service is the "heart" of the CTP service, in the sense that it is responsible for reading and parsing the XML formatted proxy rules, determining what rules should be run, and retrieving and/or modifying the external content (that is, the content from the destination).

The JSP Server container also holds the CTP Transaction Processors 224, which manage the processing stages in the transaction processing, as discussed in greater detail hereinafter.

The Web Server (Apache) 230 is the front end of the CTP service, which initially receives the incoming request. Apache is an example of an open source Web Server that can be used in the CTP program with the Tomcat servlet engine. The Web Server is connected to the Tomcat jsp container by the connector "mod_jk." It is also possible to provide a setting in the CTP program to work without using the Web Server, and to use the HTTP server component of the Servlet Engine instead.

The CTP service, and more specifically, the CTP Transaction Processors 224, have a number of functionalities not provided by the commercially-available Web proxies, including a stream buffering functionality 224a, a transaction processing functionality 224b, an authentication processing functionality 224c, and a URL wrapping functionality 224d.

Stream Buffering 224a

The CTP service employs a novel data windowing method throughout the request processing stage 320, the content processing stage 330, and the output processing stage 340 of the transaction processing component, to enable advanced processing of the Web stream that passes through the proxy.

Regular expressions are filter patterns that are composed of text and punctuation, and that define a pattern that one is looking for ("text of interest"). Regular expressions can use wildcard characters, etc. As an example, the regular expression token '*' is a wildcard character, so the regular expression "S*day" would match "Saturday" and "Sunday", but not "Tuesday." In the context of the present invention, regular expressions are an available tool that can be used for specifying simple or complicated pattern matches; and "text of interest" is the specific text that is found that matches a regular expression. Also in the context of the present invention, the rules that define the behavior of the CTP program have many parts. Often, these rules have a "findValue" component that specifies what pattern to look for. In the "findValue" and other components, the regular expression syntax is used to define the pattern. Thus, the regular expressions are used to define rules, which in turn define the text of interest and the actions required on this text.

Since the CTP service allows regular expressions to be used when creating the search rules, an efficient method of examining the stream is necessary. It is not efficient to wait to cache the entire HTTP response/request before sending the information out to the proper destination. Thus, a buffer window is employed, which takes into account the search terms for the task (if any search is required).

If regular expressions are employed to parse HTTP transactions, performance can be an issue when processing large HTML/Text files. Regular expressions can be fairly complex algorithmically, which significantly slows the transaction. Additionally, most of the target text constitutes a small subset of text within a larger file. These constraints drove the solution to CTP's novel approach to limiting the scope of the text processed—the use of a smart buffer window.

In order to efficiently process multiple sequences of regular expressions in the HTTP content, a sequence of filtering streams is set up. When each stream is read, a window of operation is built containing possible text of interest (i.e., a single HTML tag). The buffer is created by a byte-by-byte comparison of the possible text of interest with some bounding text. More specifically, a start tag and end tag are specified in most data manipulation rules. The buffer is created by doing the comparison first on the 'start' tag, and then on the 'end' tag, which results in a temporary buffer. This buffer is then used for the transaction, which makes the processing faster because the CTP service is working on a smaller window of data, rather than the entire stream.

When the buffer matches a predefined condition, the buffer is then handed off to another entity responsible for running the regular expression. This buffering method significantly increases the performance of the CTP service over other proxies, which typically examine the entire stream as a whole, while still allowing for complex regular expression use to accomplish find/replace tasks within the content stream.

CTP Transaction Processing 224b

The CTP service has a novel Web transaction processing model 224b in which, as shown in FIG. 3, a Web proxy transaction 300 is broken down in the CTP host 30 into four processing stages 310, 320, 330, and 340, along with the four different states 350, 352, 354, and 356 through which the HTTP transaction passes.

The four states of the Web proxy transaction 300 are:

1) Initial request 350 from the Web client 10 to the CTP host 30.

2) Modified requests 352a, 352b, and 352c from the CTP host 30 to the Web server (source) 50 (stage 310 produces a modified request 352a, which can be acted on by stage 320 to produce a further modified request 352b, which can be acted on by stage 330 to produce a still further modified request 352c).

3) Response 354 from the Web server 50 to the CTP host 30.

4) Modified responses 356a and 356b from the CTP host 30 to the client 10 (stage 330 produces a modified response 356a, which can be acted on by stage 340 to produce a further modified response 356b).

Figure 3A:
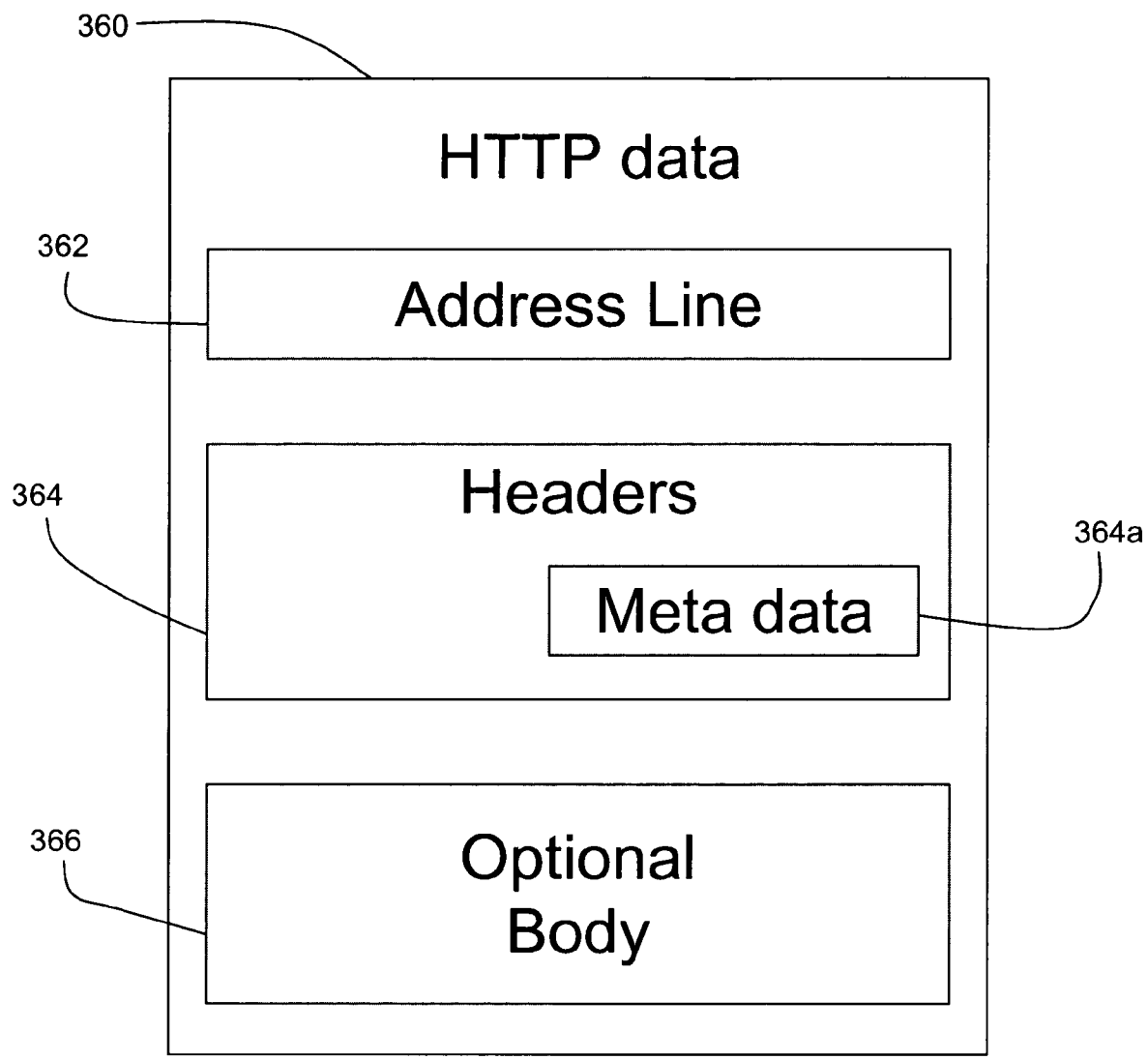
FIG. 3A is a diagram showing the generic structure of the HTTP data of the components of the Web proxy transaction that is carried out in accordance with the present invention.

FIG. 3A is a diagram showing the generic structure of the HTTP data 360 of the four components 350, 352, 354, and 356 of the Web proxy transaction 300. The HTTP data 360 includes an address line 362 (the TCP/IP address of the source and destination), an HTTP Header 364 (which includes metadata 364a about the HTTP transaction, including such items as size of the data, type of the data, and any cookies that are present), and an HTTP Body 366 (the actual payload of the HTTP transaction). In most Web transactions, the HTTP body 366 contains the text of the request or the text of the HTML Web page that is requested. In each of the four processing stages 310, 320, 330, and 340, any of the parts 362, 364, and 366 of the HTTP data 360 can be analyzed and modified.

The initial step in the transaction processing model 224b is the novel pre-processing stage 310, which occurs before any extensive analysis occurs. The pre-processing stage 310 is optimized for performance, so that the entire HTTP transaction does not have to be examined (and thus slow down the transaction). Triggers are specified via XML to prompt certain behavior. These triggers have certain criteria, which if met, will prompt an action on the HTTP transaction. One important action that can take place during the pre-processing stage 310 is the assignment of a CTP session to the HTTP transaction. CTP sessions are used to mark the HTTP transaction for certain behavior.

After the pre-processing stage 310 is completed, the CTP software performs the request processing stage 320. The XML rules that provide the logic for the CTP software are divided into different rule types (i.e., Request rules, Content rules, and Output rules) that correspond to these different phases. During the request processing stage 320, all request rules are examined, and compared to the input HTTP transaction.

The request processing stage 320 occurs when the initial HTTP request 350 is processed through the CTP service, and before the request is sent on to the destination. During the request processing stage 320, any aspect of the HTTP request 350 (the address line, the request header, and/or the request body) can be modified. Rules can be enacted based on certain conditions specified in the XML. For example, a rule can be written to change all requests to a certain destination. After the request processing stage 320, the modified HTTP request 352 is sent out.

The content processing stage 330 operates both before and after the HTTP transaction is sent out to the Web server 50. However, most of the "user" rules (that is, rules created by users, which can be rules related to content, request, and/or output, and which are differentiated from "system" rules, which are always in place), which are executed at the content processing stage 330, occur after the original HTTP response 354 is received from the Web server 50 into the CTP host 30. Any Content rules that are defined for this transaction are evaluated and executed. Content processing can modify any part of the HTTP response 354 as it first is received by the CTP host 30. Content processing includes modifying the address line, modifying the response header (for example, changing cookie values returned), and modifying the response body (for example, changing the content of the HTML page that is returned).

The output processing stage 340 is the final stage of the transaction processing 224b, and occurs just before the response is returned from the CTP to the Web client. The output processing stage 340 is entered after any content processing occurs in the content processing stage 330. As in the other stages of processing, any Output rules specified are evaluated and executed during the content processing stage 330. Also, any aspect of the response can be examined and modified during the content processing stage 330. One example, of response modification is use of an Output Process to 'catch' response codes from the Web transaction, and act appropriately. For example, in the HTTP protocol, there are numeric response codes to a request. The numeric code 200 is a "normal" response. However, 500-level responses are for errors. So, as an example, an Output Process can be used to look for 500 responses, and proceed with an action.

CTP Authentication Processing 224c

Figure 4:
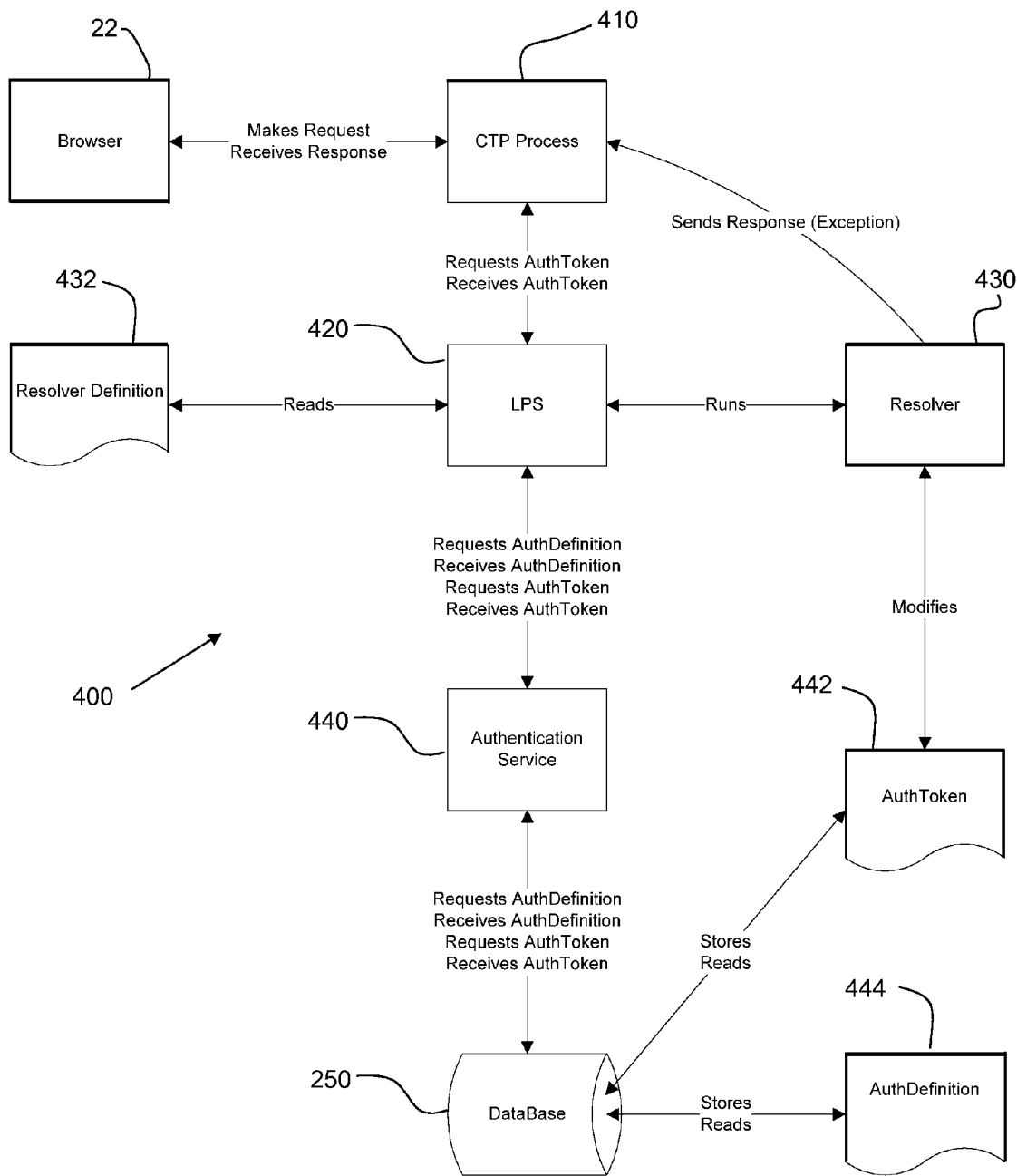
FIG. 4 is a flow diagram of the authentication process provided by the CTP.

FIG. 4 illustrates the different components and stages of CTP authentication processing 400 during a Single Sign On ("SSO") transaction. Authentication processing occurs when a CTP component (that is, any aspect of the HTTP transaction processing—including the request processing 320, content processing 330, or output processing 340) is accessed via a Web-connection, and an authentication is required as part of that application (for example proxying an application that requires a form-based, user/password authentication before retrieving the content). That is, if any of the rules that govern any aspect of the transaction processing request, content, or output processing refer to an authentication variable, then the authentication processing occurs.

In typical Web-based applications, some form of authentication is required, typically when the user first visits the application. Upon successful login, an authentication token is created on the application server. The authentication token is also indexed by a session token on the client. In most applications, this indexing is accomplished by one or more session cookies, which are stored on the client browser.

During subsequent Web transactions for this session, the CTP must continue to pass the correct session tokens in the HTTP transaction; otherwise, individual page requests will fail. The CTP must identify the user session, and manage the authentication tokens to the request.

The CTP authentication processing 400 includes a Web browser 22, the CTP process 410, a login proxy service ("LPS") 420, a resolver 430, resolver definitions 432, an authentication service 440, an authentication token ("AuthToken") 442, an authentication definition ("AuthDef") 444, and a database 250.

Authentication processing 400 is always initiated by a user connecting to a Web application through the CTP server. The client is always a Web browser 22. The CTP process 410 is begun when the client makes its first request to this application.

The CTP process 410 is a transient component that is created for a specific piece of content. A unique request initiates a CTP process 410, which is governed by the XML-based ruleset that controls the processing done on this transaction. If there are SSO rules associated with the CTP process 410, then the CTP authentication processing 400 occurs.

The Login Proxy Service (LPS) 420 is a sub-component of the CTP. Its purpose is to control the authentication process.

The resolver 430 handles obtaining the credentials for a specific authentication, as well as submitting these credentials to the external authentication service (such as a specific URL of the application). Additionally, the resolver 430 handles both success and failure conditions.

The resolver 430 is defined by a specific set of XML rules (referred to herein as the resolver definitions 432). These resolver definitions 432 are loaded in on startup of the CTP process (or by command line load), and cached in the CTP memory (which is contained in the CTP program running on the JSP Server 220, which resides on the CTP host machine). These resolver definitions 432 are uniquely named, and contain all of the information needed by the resolver 430 to determine a successful or unsuccessful login.

The authentication service component 440 handles authentication within the CTP, as it relates the user to the individual component that is proxied. The CTP must manage the multiple authentication tokens each user may have active during any given CTP session. The authentication service is the system API that allows other CTP components to access authentication information.

The Authentication Token 442 is created when a CTP process recognizes that an SSO is required. Since each Web application has unique requirements and naming, unique authentication tokens 442 are required. Applications vary in the number and name of variables needed in the session for authentication. The CTP therefore creates unique AuthTokens 442 for each proxied Web application.

The Authentication Definition (AuthDef) 444 is required for each application SSO. The AuthDef 444 specifies the variables needed for the authentication transactions, as well as the information about each variable, such as lifetime, default values, etc.

The database 250 represents the datastore in the CTP application. The database 250 can either be an in-memory database, or a traditional relational database system (depending upon how the CTP is setup). For authentication processing, the database 250 stores the authentication credentials, and is accessed via the CTP Authentication Service 440.

A typical CTP authentication transaction 400 includes the following steps:

1) The Web client 10 requests content from a Web application, which is proxied through the CTP service. The Web application must match a set of definitions in the CTP program; otherwise it will simply be forwarded on, unmanaged.

2) A CTP process 410 is created for this request, and if the request matches a specific Web application SSO definition, the authentication processing will continue.

3) The CTP process 410 then requests an AuthToken 442 for this application from the LPS 420.

4) The LPS 420 then starts the process of obtaining an AuthToken 442. First, the LPS 420 checks with the Authentication Service 440 to determine if, for this particular application, there is already an AuthToken 442 created for this particular user (as explained above, credentials are stored for each user, for each application). If yes, then this AuthToken 442 is returned. If not, a new resolver 430 is run. The resolver 430 is responsible for obtaining the initial authentication from the external service.

5) Before the resolver 430 is run, the resolver definitions 432 are read in. The resolver definitions 432 are loaded and cached in the running CTP.

6) Once the resolver definitions 432 are read in, the resolver 430 determines the specific authentication definitions (AuthDef) 444 that are required for this application (for example 'username', 'password', 'sessiontoken').

7) The resolver 430 checks the database 250 to determine whether the authentication credentials are stored for this user, for this application (as explained above, credentials are stored for each user, for each application). If no (that is, if the resolver 430 identifies that no credentials are stored for this user, for this application), then the resolver 430 queries the user for input of the credentials, after which the credentials are stored in the database 250 for re-use. If yes, the resolver 430 simply re-submits these credentials from the database 250.

8) If there is an authentication error during this process, the resolver 430 must return this error to the user, and allow credentials to be re-entered 9) Upon successful authentication, the resolver 430 stores the active AuthToken 442 in the database 250.

10) The database 250 then returns this active AuthToken 442 to the LPS 420, which is used in the request to the proxied Web application.

The authentication process for typical web sites and applications typically involves the use of a session cookie, which is set after a user successfully logs in to the site. The CTP service duplicates this authentication process, providing the user's credentials to the appropriate back-end server, and preserving any authentication cookie on the CTP server 230. This server-side method of tracking cookies is unique among web transaction proxy technology.

Due to a combination of the four-stage transaction processing 224b, the ability to store/insert cookies, and the variable processing syntax, one can create rules to instruct the CTP program how to handle authentication through the proxy to destination servers 50.

URL Wrapping 224d

Another novel component of the CTP service is the method it uses for encoding or "wrapping" the URLs that are contained in the proxied pages. All references (anchor tags, images, JavaScript code references, etc) need to be modified, so that when the client 10 requests the specific content, the reference is translated on the proxy server and the actual path is resolved.

The novel aspect of the CTP service's solution to this problem is that it embeds the host/port/protocol information within the URL line itself. When the CTP service retrieves any HTTP (HTML/JS/CSS/XML etc.) page, all references to external content are rewritten in this format. Content modification is thus performed on the proxy, not on the client 10.

The CTP program can be embedded as a module in a portal, for example in the enPortal™ portal, which is a secure, single sign on network management integration portal marketed by Edge Technologies, Inc., and which is the subject of U.S. patent application Ser. No. 09/812,136, filed Mar. 19, 2001.

It is to be understood that the present invention is not limited to the illustrated user interfaces or to the order of the user interfaces described herein. Various types and styles of user interfaces may be used in accordance with the present invention without limitation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of authentication processing during a Single Sign On transaction when any aspect of at least one of a transaction processing request, content processing, and output processing is accessed via a Web connection, and an authentication is required as part of a Web application, the method comprising the steps of:

receiving a request from a user for content from the Web application, wherein the Web application is proxied through a content transform proxy service implemented by a content transform proxy program;

using the Web application to match a set of definitions in the content transform proxy program;

creating a content transform proxy process for the content request;

determining whether the content request matches a specific Web application single sign on definition;

if the content request matches the specific Web application single sign on definition, continuing the authentication processing;

using the content transform proxy process to request an AuthToken for the Web application from a login proxy service;

obtaining the AuthToken using the login proxy service;

reading in pre-determined Resolver definitions;

after reading in the resolver definitions, using the resolver to determine specific authentication definitions that are required for the Web application;

using the resolver to check a database to determine whether, for the Web application, authentication credentials are stored for the user;

if the authentication credentials are stored for the user, using the resolver to re-submit the authentication credentials from the database;

if the authentication credentials are not stored for the user, using the resolver to query the user for input for the authentication credentials;

upon successful authentication, using the resolver to store the AuthToken in the database; and using the database to return the AuthToken to the login proxy service used in the request to the proxied Web application.

2. The method of claim 1, wherein the step of obtaining an AuthToken comprises the further steps of:
  using the login proxy service to check with an Authentication Service to determine if, for the Web application, there is already an AuthToken created for this particular user;
  if the AuthToken has already been created, then returning the AuthToken;
  if the AuthToken has not already been created, then running a new resolver; and
  using the new Resolver to obtain initial authentication from an external service.

* * * * *